Figure 1:
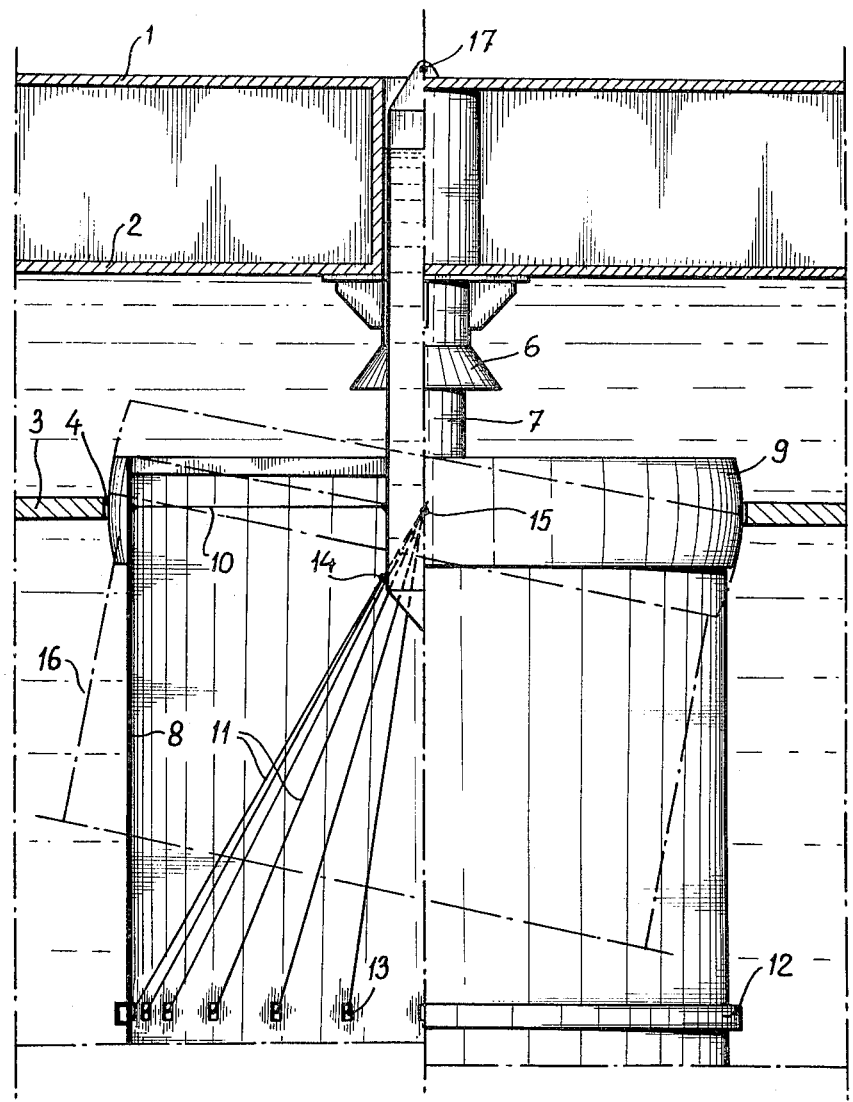

United States Patent [19]

van der Pot

[11] 4,363,570
[45] Dec. 14, 1982

[54] UPPER END MOUNTING FOR DEEP WATER THERMAL CONDUIT

[75] Inventor: Barend J. G. van der Pot, Delft, Netherlands

[73] Assignee: Hollandsche Beton Groep N.V., Rijswijk, Netherlands

[21] Appl. No.: 193,691

[22] Filed: Oct. 3, 1980

[30] Foreign Application Priority Data

Oct. 30, 1979 [NL] Netherlands ................. 7907951

[51] Int. Cl.³ .................. E02D 21/00; E02B 17/00
[52] U.S. Cl. ............................ 405/303; 405/195; 114/264
[58] Field of Search ............ 405/169, 195, 196, 303; 114/264; 9/8 R, 8 P; 175/7; 166/367

[56] References Cited

U.S. PATENT DOCUMENTS 3,552,343  1/1971  Scott .................................. 114/293
3,828,380  8/1974  Lebovits et al. ...................... 9/8 R
4,222,341  9/1980  Larsen et al. ...................... 114/264
4,234,269  11/1980  Person et al. ....................... 405/195

Primary Examiner—David H. Corbin
Assistant Examiner—Nancy J. Pistel
Attorney, Agent, or Firm—Sughrue, Mion, Zinn, Macpeak and Seas

[57] ABSTRACT

A flexible and pivotable connection for the top of a cold water conduit 8 to a floating device 1-3 provided with means for the conversion of energy based on the temperature difference between surface water and deep sea water supplied by the conduit. The connection supports the top of the conduit by means of flexible cables to a central core 7 guided and fixed in a sleeve 5, 6 of the floating device. The flexible cables 10, 11 partly extend horizontally from the lower end of the core to a top ring 9 of the conduit, and partly from the lower end of the core downwardly towards a lower annular portion 12 of the conduit.

4 Claims, 2 Drawing Figures

UPPER END MOUNTING FOR DEEP WATER THERMAL CONDUIT

A floating device provided with a downward running conduit.

The invention relates to a floating device provided with a downward running conduit fastened within an opening at the lower side of said floating device, such as a cold water conduit in a power station operated on a temperature differential base in which the difference in temperature between the warm surface water and the cold deep sea water may be converted into electric energy.

Such a device is known from the article "OTEC: Ocean Thermal Energy Conversion" in the "Ingenieur", Vol. 91, no. 28 29, July 12, 1979, pages 507 to 513 inclusive. On page 511 of this article there are diagrammatically represented a number of possible embodiments of cold water conduits from which it is apparent that important constructive benefits may be gained if the cold water conduit is flexible. A cold water conduit is of large dimensions. Its length may for that matter amount to many hundreds of meters if not some thousands of meters while the diameter thereof may amount to some tenth of meters, e.g. 30 meters. The floating device, a vessel or a floating platform, is subjected to movements that cannot be followed by the conduit, whereas the conduit per se is subjected to sea currents in the uppermost layers as well as at great depths which currents may have different directions.

Another important problem resides in connecting the conduit to the floating device. It is difficult if not impossible to accommodate a conduit having a large diameter within a closely fitting opening because the movements of the conduit and the device, respectively, are independent with respect to each other. The risk of causing damages is large and the required accuracy of accommodating the conduit is hardly attainable if one has to master the conduit by means of cables, winches, etc. while both the conduit and the floating device are meanwhile subjected to movements of rotation and translation in a quite independent manner with respect to each other.

Not only the fastening construction per se but also the manipulative efforts that have to be made in connecting the conduit present great problems.

The object of the invention is to provide a simple effective solution in solving this problem.

According to the invention this object is attained in that at its top the conduit is provided with a central core extending beyond the top of said conduit and fitting into a sleeve of the floating device, said conduit being supported from said core by means of horizontally arranged flexible tensioning means, such as cables, as well as by means of flexible tensioning means, such as cables, running obliquely downward from said core to an annular portion of said conduit present at a lower level, the direction of the latter tensioning means running through a point in the center of the core present in the plane of the horizontal tensioning means as well as in the plane of said lower side, while only said core may be fastened in said sleeve. The central core opens the possibility to accommodate the cold water conduit easily within the opening in a centered way while the suspension of the conduit from the core by means of cables provides for accommodating swinging movements of the top of the conduit within the opening in all directions at a small angle. The cables running obliquely downward thereby provide for accommodating the weight of the conduit whereas the cables arranged in a horizontal plane provide for centering the conduit.

The cables may be arranged radially but may also be arranged like the spokes of a wheel, that is to say in opposite directions at an angle with respect to the radial, which may be carried out in such a manner that they constitute tangential lines to the circumference of the cylindrical core. Consequently it is achieved that torsional forces may be accommodated while maintaining the required flexibility.

Preferably the upper edge of the conduit is provided with an external ring having a spherical plane the radius of which substantially equals the radius of the said opening, said ring having such a height that at the swinging movements to be expected the opening is kept closed by the ring so that at this location no or only little leakage may occur between the water present in the conduit and the surrounding water.

According to the invention one will thus obtain a connection which in itself is of a flexible character. Moreover one obtains a connection allowing for a relatively quick assembling. This is because the first contact is made by the central core the dimensions of which are small in comparison with the diameter of the conduit. The core may rotate with respect to the conduit so that one has to master only relative translational movements. This is achieved by pulling the core upward into the sleeve provided with a centering edge and in this operation the relative vertical movements hardly play any role because the core may slide into the sleeve. At the time the outer edge of the conduit will near the opening in the bottom of the floating device the core will be slid that far into the sleeve that the centering of the conduit in the opening will not present any problem any more.

It should be remarked that the principle on which the invention is based is applicable in any instance in which a long conduit having a large diameter has to be connected to a floating device.

Figure 2:
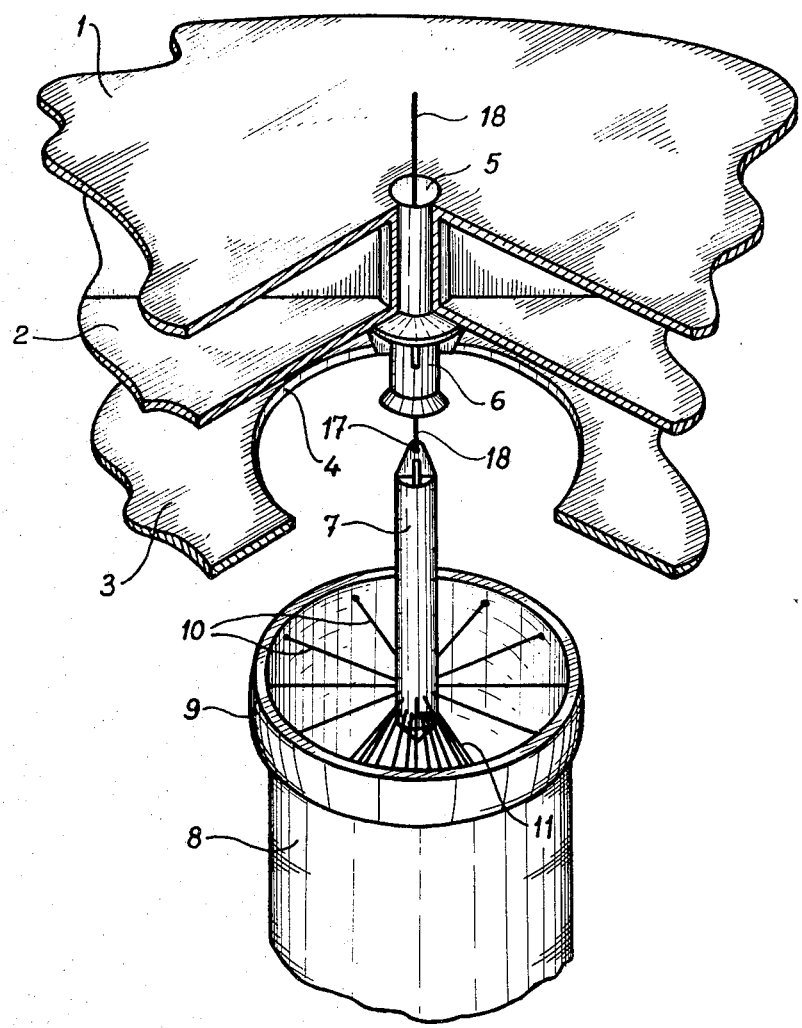

The invention will now be elucidated in detail with reference to the drawings in which FIG. 1 represents a cross-sectional view of the device according to the invention in which only part of a floating platform and part of the conduit are shown;

FIG. 2 shows a step during the assembling.

With reference to FIG. 1 there is shown a floating platform having a deck 1, a lower deck 2 and a bottom 3. Within the bottom 3 there is provided an opening 4.

Between the deck 1 and the lower deck 2 there is provided a sleeve 5, said sleeve 5 projecting downward and having a guide or searching edge 6.

The above-described parts may also form part of a vessel.

A pipe 7 forming the central core for the top region of the cold water conduit 8 is put into the sleeve 5. At its top this cold water conduit is provided with a ring 9 having a spherical outer face fitting into the opening 4. The top part of the cold water conduit 8 is fastened to the core 7 by means of radially arranged cables 10 as well as cables 11 running obliquely downward and connected to an annular region 12 at an appreciably lower level. The cables 11 run from fastening points 13 of the ring 12 to fastening points 14 mounted on the core in such a manner that the extension of the cables runs through a point 15 in the plane of the cables 10. Consequently there is formed essentially a pivoting suspension from the point 15 of the core 7 whereby swinging movements in all directions may occur over an angular range of, e.g. 10° or the like, as indicated by the dash-and-dot lines 16.

At its top the core 7 is provided with a hauling line 17 and upon assembly this core may be fastened in any known way within the sleeve 5 like e.g. by means of cross pins, welds, groutings etc.

From FIG. 2 it is evident how before assembling the cold water conduit supplied or provided in an arbitrary way is brought below the sleeve 5, 6 by means of the hoisting cable 18 whereupon the cold water conduit reaches its proper place in a simple way by hoisting.

I claim:

1. A floating device provided with a downwardly running deep sea conduit disposed within a bottom opening at a lower side of said floating device, such as a cold water conduit supplying a floating power station in which the difference in temperature between warm surface water and cold deep sea water may be converted into electrical energy, characterized by: a central core (7) extending upwardly beyond a top of said conduit (8), said core fitting within a generally vertical sleeve (5) extending downwardly through the floating device, said conduit being coupled to said core by a plurality of horizontally disposed flexible centering cables (10) and by a plurality of obliquely oriented flexible weight supporting cables (11), said weight supporting cables running downwardly from said core to an annular portion (12) of said conduit at a lower level, extensions of said weight supporting cables intersecting a point (15) in the center of the core lying in a plane of the centering cables and in a plane of said bottom opening (4), and means (17) securing said core within said sleeve.

2. The device according to claim 1, wherein said horizontal centering cables are arranged radially.

3. The device according to claim 1, wherein said horizontal centering cables are arranged like the spokes of a wheel running in opposite directions at an angle with respect to the radial.

4. The device according to any one of the preceding claims, wherein the upper edge of the conduit fits within the bottom opening and is provided with an external ring (9) having a spherical plane the radius of which substantially equals the radius of the bottom opening.

* * * * *